United States Patent [19]

Boulicault

[11] Patent Number: 4,922,946
[45] Date of Patent: May 8, 1990

[54] REMOTE INFLATION AND DEFLATION SYSTEM AND VALVE THEREFOR

[75] Inventor: Jean-Michel Boulicault, Germain Lespinasse, France

[73] Assignee: Etat Francais, France

[21] Appl. No.: 254,812

[22] Filed: Oct. 7, 1988

[51] Int. Cl.$^5$ .............................................. F16K 7/10
[52] U.S. Cl. ................................... 137/102; 137/225; 137/226; 152/416
[58] Field of Search ............... 137/102, 224, 225, 226; 152/416, 417

[56] References Cited

U.S. PATENT DOCUMENTS

| | | | |
|---|---|---|---|
| 134,220 | 12/1872 | Riley | 137/512.3 |
| 2,633,889 | 4/1953 | Vignin | 152/417 |
| 3,084,707 | 4/1963 | Frye | 137/102 |
| 3,086,542 | 4/1963 | Mosier | 137/102 |
| 3,093,153 | 6/1963 | Horowitz | 137/102 |
| 3,314,440 | 4/1967 | Horowitz | 137/226 |
| 3,606,904 | 9/1971 | Taylor | 137/102 |
| 4,744,399 | 5/1988 | Magnuson et al. | 152/417 |
| 4,782,879 | 11/1988 | Le Chatelier et al. | 137/225 X |

Primary Examiner—Gerald A. Michalsky
Attorney, Agent, or Firm—Oliff & Berridge

[57] ABSTRACT

A piloted pneumatic valve for controlling pressure at a distance. The valve includes a cavity divided into two chambers by a membrane. One chamber is the pilot chamber, and the other the escape chamber, connected to a pressurization and depressurization circuit, connected to the controlled pressurized volume through an orifice, and to the outside air through at least one escape hole. The system also includes a piloted valve pressing the membrane against the orifice to close it, and an opening, communicating with the circuit leading to the pressurized volume, and fitted with a check valve poppet prohibiting flow back from the capacity to the circuit. For application to automotive vehicles.

6 Claims, 4 Drawing Sheets

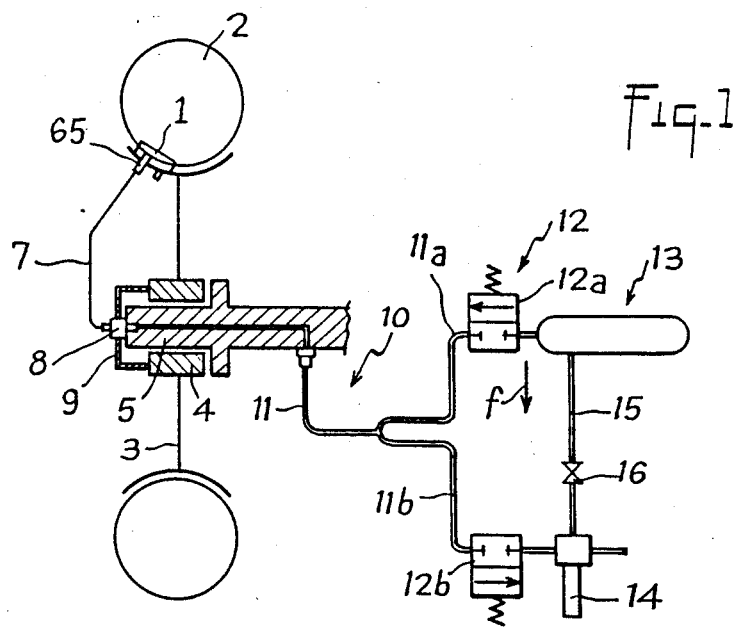
Fig. 1
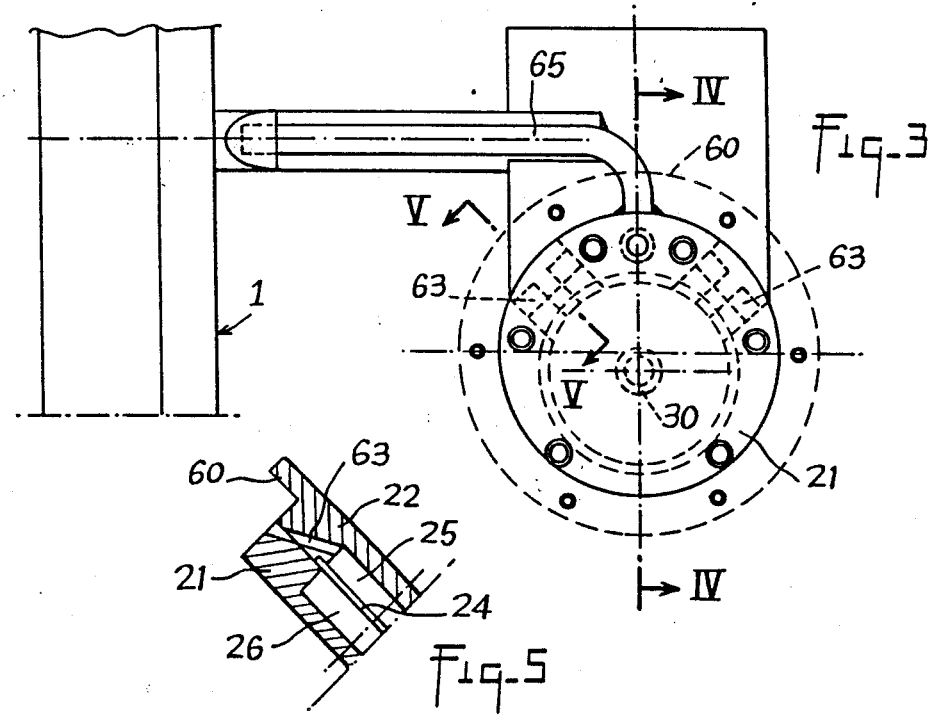
Fig. 3
Fig. 5

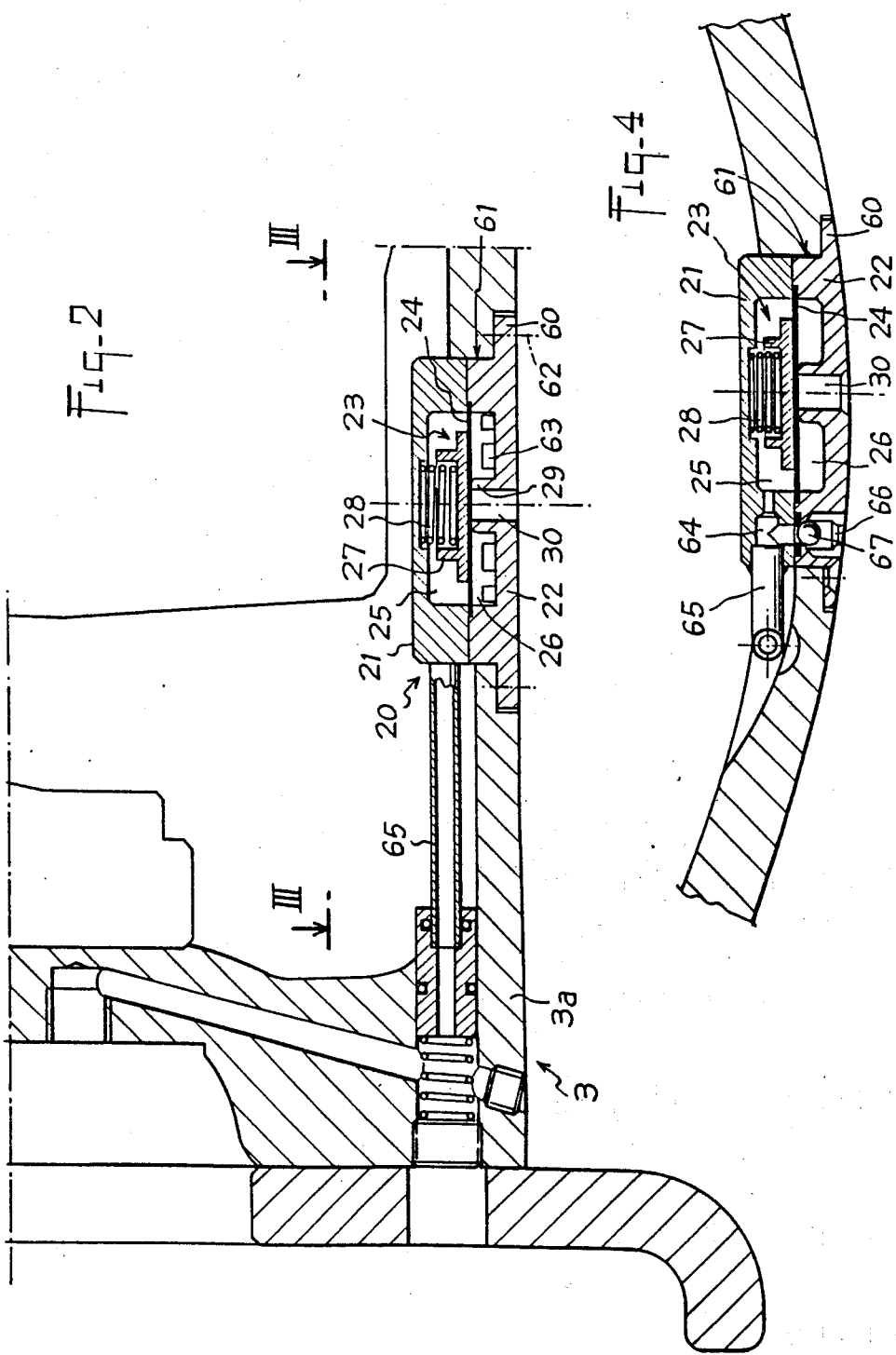

REMOTE INFLATION AND DEFLATION SYSTEM AND VALVE THEREFOR

BACKGROUND OF THE INVENTION

1. Field of the Invention

This invention relates to the remote control of the inflation or deflation of a volume from a gaseous fluid under pressure, and more particularly the remote control of the inflation pressure of an automotive vehicle tire on a wheel.

2. Description of the Prior Art

In the above field of application, it is known it is sometimes useful to be able to control the inflation pressure of tires remotely, in order to match the tire traction with the conditions of the terrain over which the vehicle is moving. This is in particular the case for cross country vehicles that must advance under the most favorable conditions, whether ground surface is hard, stony or even soft, without the driver having to stop the vehicle to adapt the inflation pressure of the different tires manually.

This application is of course only given as an example, because in many other fields it is also found useful and even necessary to be able to adapt the inflation pressure of any volume, and to do so at a distance.

To solve the above problem, the prior art offers only a few solutions. One known system employs a valve which, when in its normal rest position, closes a path of circulation between the volume and an available source of fluid pressure.

Whenever it is desired to inflate the volume, the valve is driven against the action of a recall spring, in such a way as to open the circulation circuit.

Whenever it is desired to partially deflate the volume, a fluid under pressure is applied to raise the valve and the source of pressurized fluid is isolated, to keep the valve open during the time needed to produce a slow decompression, through an expansion valve, of the fluid initially confined in the volume.

Such a installation requires a particularly complicated remote control circuit, which becomes even more complex when one or more volumes have to be controlled from a distance, as is the case in the application to automotive vehicles.

Beyond this disadvantage, it should be noted that the deflation phase calls for a major transit time, which is established by means of a complex system, remote-controlled by an expensive and fragile logic control circuit.

In the particular application to the technical field at hand, the prior art proposes no satisfactory system, considering that each volume, consisting of a vehicle wheel, must necessarily be isolated from the control system by a rotary joint which is held at pressure throughout the entire inflation phase.

Such a rotary joint is thus intensely stressed in rotation and in pressure, so that the friction packing(s) providing the rotary seal are subject to major stresses and are unable to provide reliable service.

This disadvantage is of particular concern with vehicles which receive hard use.

These systems provide simultaneous and relatively slow deflation of the tires, which is also a disadvantage.

A remotely controlled pneumatic valve is also known which is made of two bodies, an inflation and deflation body, delimiting two cavities, called the inlet and escape cavities, communicating with each other through an opening which forms two seats, one in each chamber, for two piloted valves. This communicating line, between the seats, consists of a channel leading through a connection opening into the inflated volume, the inlet chamber being in communication with a connection opening into a control system, while the escape chamber communicates with the ambient atmosphere through vent holes.

Such a valve is satisfactory, but may be considered expensive to construct. Furthermore, it size, does not lend itself well to an integrated installation in a vehicle wheel.

SUMMARY OF THE INVENTION

The present invention is intended to improve upon the valve of the above type, in order to reduce its cost price and significantly reduce its dimensions, so as to make an integrated installation in a wheel possible particularly in automotive vehicle tires, and more precisely an installation in the wheel rim.

The improvements according to the present invention also have the purpose providing a remote control system, using a valve according to the invention, which is capable of providing a measurement of the pressure inflated in the volume.

Another object of the invention is to provide a simplified in construction, with less parts in moving, to a single integrated component having a low cost and capable of being installed and removed easily without requiring adjustments.

To achieve the abovementioned goals, the valve according to the present invention includes:

a cavity divided by a membrane into two chambers, called the "pilot" and "escape" chambers. The former communicates with a pressure or vacuum source and the latter with an orifice leading into the volume to be controlled, and at least one escape hole leading out of the volume into the atmosphere;

a controlled valve pressing the membrane against the said orifice, to close it;

and an opening communicating with a supply circuit, leading into, the volume and controlled by a check valve prohibiting flow from the volume back to the supply circuit.

BRIEF DESCRIPTION OF THE DRAWING

A better understanding of the present invention may be had from a consideration of the following detailed, taken in conjunction with the accompanying non-exhaustive drawing in which:

FIG. 1 is a schematic view illustrating an applied example of the invention:

FIG. 2 is a larger scale elevation cross-section of the invention;

FIG. 3 is a plan view taken along the line III—III in FIG. 2;

FIG. 4 is a transverse cross-section taken along line IV—IV of FIG. 3;

FIG. 5 is a larger scale partial cross-section taken along line V—V of FIG. 3;

DESCRIPTION OF THE PREFERRED EMBODIMENTS

Figure 6:
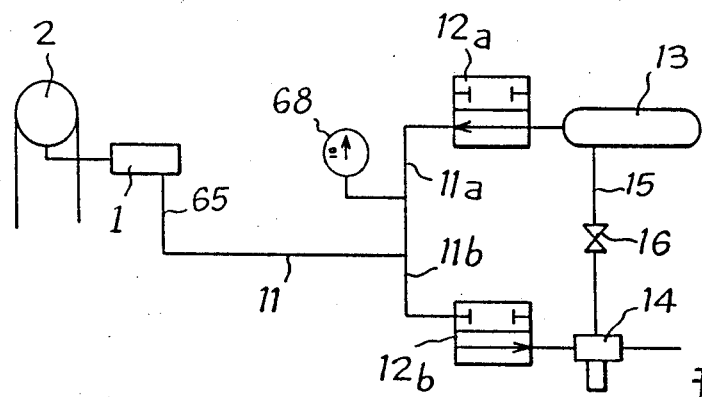
FIGS. 6 to 8 are schematic views illustrating different phases of operation of the invention.

FIG. 1 illustrates a preferred embodiment of the piloted pneumatic valve according to the invention. In this example, the valve 1 is used to control the pressure in tire 2 of a wheel 3 of an automotive vehicle, which is not shown. According to the schematic illustration, wheel 3 is mounted by hub 4 on an axle 5, which may be either a drive or bearing axle, or the front or rear steering axle of the vehicle. In this application, the valve 1 is adapted to the wheel 3 in such a way as to be connected by a passage 7 to a rotary joint 8 carried by an appropriate structure 9 at the end of the axle 5. The rotary joint 8 is connected to the control system 10 including a line 11 carrying fluid from the rotary joint 8 to a spool-type directional control valve 12.

Valve 12 preferably includes two two-way directional control valves 12a and 12b, mounted on two branch lines 11a and 11b, leading respectively to a source of fluid under pressure 13 or to a vacuum source 14. According to the schematic of FIG. 1, the source 13 consists of a compressed air accumulator or a compressor. The vacuum source 14 may be constructed in many different ways so as to place the line 11b in a relative vacuum. As an example, the source 14 may consist of a vacuum nozzle that can be supplied through source 13 by means of a tube 15, controlled by a flow control valve 16.

It goes without saying that the system described above is given only as an example, since more complex circuits, capable of assuming other functions, can also be constructed. Such a system may also be used for the purpose of remotely controlling each wheel of an automotive vehicle individually, or a group of wheels, or all of the wheels together.

The piloted pneumatic valve illustrated in greater detail in FIGS. 2 to 5 consists of an inflation and deflation body 20. This body consists of two body parts 21 and 22 constructed of an appropriate material, assembled in such a way as to be disassembleable or not, face to face with each either and machined in such a way as to define a cavity 23, when assembled. These body parts 21 and 22 are constructed so as to pinch a membrane 24 between them, that is between the surfaces facing each other. The membrane is elastically deformable and divides the cavity into two chambers 25 and 26, respectively.

Chamber 25 contains piloted valve 27 associated with the membrane 24 and controlled by the action of elastic component 28, chosen so as to develop a force greater than the force available from the pressure in chamber 25. Valve 27 is thereby pressed continously against membrane 24, which forms a seal against a seat 29 protruding from the base of chamber 26. Seat 29 rims the edge of orifice 30 in semibody 21. The orifice 30 extends in a direction perpendicular to the membrane plane and passess through body 21.

The semibodies 21 and 22 form a compact, slender assembly that can be mounted on wheel 3 and preferably integrated in the thickness of the rim 3a of wheel 3. For this purpose, as can be seen in FIGS. 2 and 4, it is advantageous to construct body 22 so that it has a collar 60 allowing it to fit into a complementary recess or opening 61 of the rim in which the valve is fixed, by suitable means such as a screw 62. The opening 61 is designed so that the valve is flush with the outer peripheral surface of the rim 3a, that is, the surface facing the tire 2. The integrated assembly of the valve is therefore achieved so that the orifice 30 opens on the same face and is in communication with the internal volume of the tire, which constitutes the volume in the sense of the invention.

Bodies 21 and 22 also have a machined passage 63 (FIG. 5) communicating with chamber 26 and opening to the outside atmosphere, preferably at the periphery or on the face of body 21 located outside the thickness of the wheel rim 3a and therefore directed externally with respect to the volume, which is the tire 2.

Body 21 includes through-hole 64 communicating with chamber 25 and provided with tube 65 connecting it to passage 7. The hole 64 also communicates with an opening 66 provided in bodies 21 and 22, in a direction roughly parallel to the orifice 30 and in an area located outside chambers 25 and 26. The opening 66, which therefore comes out the outer face of semibody 22, and therefore into the volume, is controlled by check valve 67, of the free plug type, opposing any flow of fluid from the volume in the direction of the drilled hole 64.

FIGS > 1, 2 and 4 show a state of rest in which directional control valves 12a and 12b shut the branches 11a and 11b, thereby isolating the piloted pneumatic valve. Piloted valve 27, pushed by spring 28, occupies the shut position holding membrane 24 closed against seat 29. Simultaneously, the fluid pressure in the tire keeps check valve 67 in the shut position.

The piloted pneumatic valve therefore constitutes a kind of shutoff valve isolating tire 2 from rotary joint 8, which is itself isolated by flow control valves 12. Rotary joint 8 can therefore operate in rotation without the stress of pressure, which guarantees reliable operation over time.

When, for a determined reason, it is appropriate to inflate tire 2, flow control valve 12a is moved in the direction of the arrow so as to establish the link between source 13 and hole 64. In this position, illustrated in FIG. 6, the fluid under pressure delivered by source 13 enters chamber 25 where its action on piloted valve 27 complements the action of elastic component 28. Valve 27 is therefore applied more increased force against seat 29 to maintain orifice 30 closed.

The pressure in hole 64 causes check valve 67 to open, allowing the fluid under pressure to pass into the tire 2.

When the inflation threshold is reached, the directional control valve 12a is driven to the position at which it shuts branch 11a, while the directional control valve 12b is simultaneously placed in the position opening branch 11b to release the pressure in the line 11.

It should be noted that the opening of directional control valve 12b can be controlled with a delay after the shutting of directional control valve 12a. It is possible, this way, to connect the pressure gage 68 to line 11, to evaluate the inflation pressure in the volume 2, since the pressure in line 11 is, by natural balancing, then the same as of the pressure in the volume.

During the inflation phase, it is observed that rotary joint 8 operates in rotation and under the stress of pressure. However, this dual function is assumed only during a relatively short period of time, considering that a pressurization phase of tire 2 while the vehicle is rolling is generally executed in a brief period of time. The rotary joint 8 may therefore operate under the best possible conditions, without continually providing rotation and seal.

Figure 7:
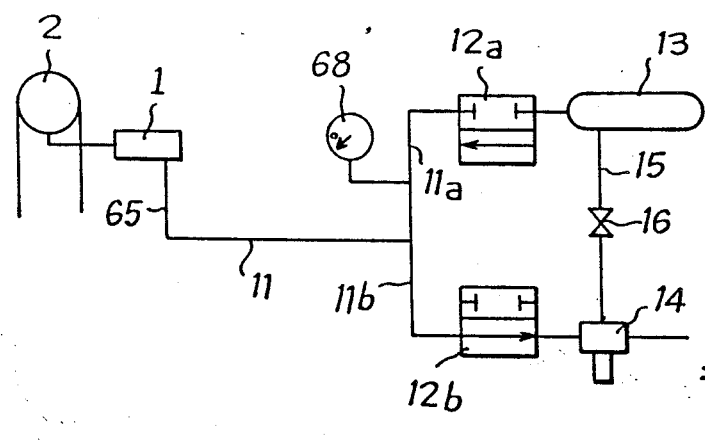

When tire 2 must be deflated, directional control valve 12a is placed in the position at which it shuts branch 11a, while flow control valve 12b is simultaneously in the position at which it opens branch 11b (FIG. 7). The source 14 is put into operation to create a vacuum in line 11. This vacuum adds to the shutting of the check valve 67 and simultaneously causes the piloted valve 27 to open, against the action of the spring 28. The membrane 24 is thereby raised and allows the fluid in the tire to pass through the orifice 30, chamber 26 and the escape passage or passages 63 to the atmosphere.

Figure 8:
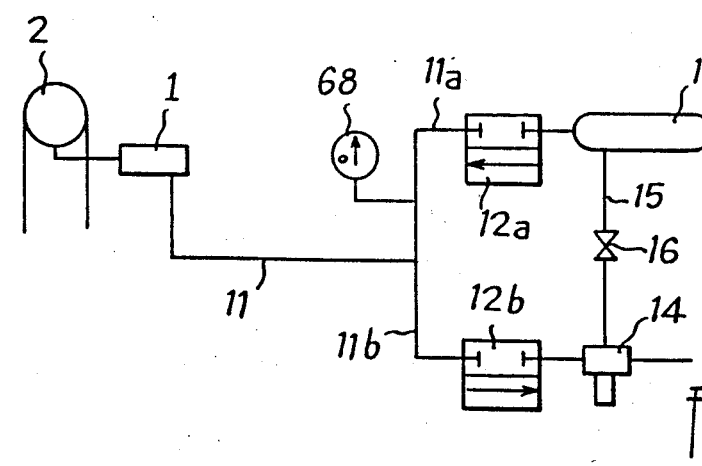

When the tire has been deflated to the desired limit, the directional control valve 12b is returned to its shut position, illustrated in FIG. 8, at which it is possible to reopen the directional control valve 12a briefly to open check valve 67 and balance the pressures between the tire and line 11. This way, the pressure gage provides an exact evaluation of the new pressure after deflation.

SECOND EMBODIMENT

Figure 9:
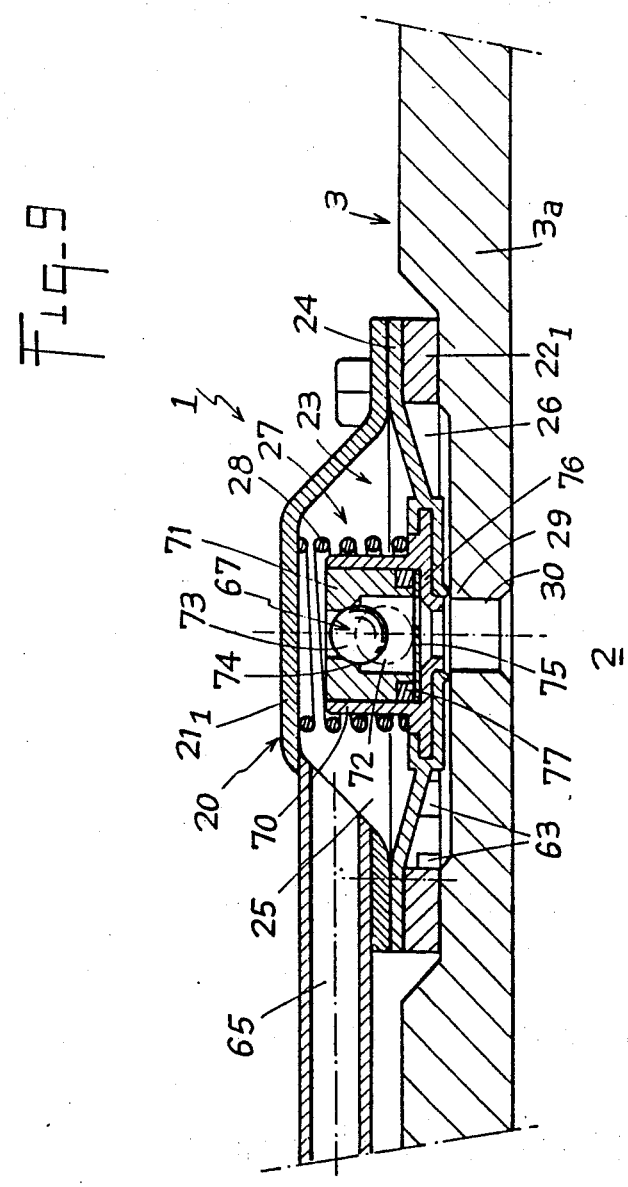
FIG. 9 is an elevation cross section showing, on a different scale, a variant embodiment of the invention.

FIG. 9 shows another embodiment in which, firstly, body 22 consists of a simple crown $22_1$ provided with grooves or passages 63 and intended to define chamber 26 by being applied and fastened, directly or with a seal placed between, on the wall or rim 3a of volume 2. Crown $22_1$ is associated with a semibody 21 which is preferably, but not exclusively, made by stamping process and associated by any appropriate means with tube 65. Crown $22_1$ and body $21_1$ together define cavity 23, which is divided into two chambers 26 and 27 by membrane 24, secured between them.

In this embodiment, membrane 24 is molded over a tubular body 70 forming piloted valve 27 in cooperation with spring 28, surrounding body 70. Membrane 24 and body 70 therefore make up a low-cost unit that is easy to store, handle, assemble and disassemble.

In this embodiment, a check valve is provided in the body 70 of the valve 27. Tubular body 70 is provided with an internal sheath 71 having an axial orifice 72 occupied by a ball 73 forming a shut-off device. The ball 73 is free to slide axially between an upper conic seat 74 formed about orifice 72 and a grid or similar component 75 placed between the base of the sheath 71 and a stopper sill 76 that is part of the tubular body 70. The sheath 71 can be mounted in valve body 70 by any appropriate means considering the type of materials being used, and in particular by gluing or crimping.

The membrane 24, valve 27, sheath 71, ball 73 and grid 75 therefore constitute a single active element integrating all the valve components, which are therefore presented in a particularly simple, compact structure.

The operation of the valve according to FIG. 9 is the same as described above, because the function of piloted valve 27 remains unchanged. The integration of check valve 67 into valve 27 does not modify the reaction of the ball 73 because, under the effect of the pressure in the volume 2, it is applied to the seat 74 to isolate the volume. In the case where a vacuum is established in chamber 25, the valve 27 raises the membrane 24, placing the orifice 30 in communication with the chamber 26 to allow the fluid to escape from the volume 2 to the outside atmosphere through the passage 63.

In all of the above, it has been indicated that the valve according to the invention allows a measurement to be taken of the inflation pressure of the volume 2. To do this, it suffices to isolate the circuit 10 after inflation, so that the pressure in the circuit, by balancing, equals the pressure in the volume 2. This is true as long as the ball 73 remains open a long enough time and there is no leak in the circuit 10. It may be considered that, if a leak exists, the ball 73 will immediately be driven to shut position, breaking off the communication between the volume 2 and the circuit 10. The pressure that will then be measured is the pressure in the circuit 10, which will not provide a true reaching of the pressure in the volume 2. To avoid this slight disadvantage, it is recommended, according to the variant of FIG. 9, to make the valve body 70 and the sheath 71 of a non-magnetic material and, to externally at the base of the sheath, to place a washer or ring 77 of magnetic material developing a localized transverse field capable of influencing the ball 73, made of a material sensitive to the magnetic field.

Under the effect of the pressure in the volume 2, the ball still occupies the position pressed against seat 74 and nothing is changed in the isolation function the ball ensures. When the volume 2 is inflated, though, the ball is pushed back against the grid 75 as long as there is no pressure drop in the circuit 10 due to the flow of a major leak in the circuit 10, and sufficient for the higher pressure in the volume 2 to become preponderant and overcome the magnetic attraction exerted by the field of ring 77. This way, it is then possible to measure the pressure in the volume 2 in the circuit 10, even when small leaks exist. The ring 77 therefore serves after a fashion to reduce the sensitivity of the ball 73, capturing it in its lower position as long as a large pressure differential $\Delta p$ is not established in favor of the volume 2 over the circuit 10.

It should be noted that the means according to the invention are capable of assuming an additional function of balancing the pressure among several volumes 2, as long as these volumes are interconnected by a common inflation circuit. After inflation, the balls 73 are held open so that a temporary intercommunication is established for the purpose of automatically balancing the pressure.

What is claimed is:
1. A valve for inflation and deflation of a volume of fluid under pressure, comprising:
   a cavity;
   a flexible membrane disposed in the cavity and dividing the cavity into a pilot chamber and an exhaust chamber;
   an orifice in the exhaust chamber in fluid communication with the volume;
   exhaust valve means cooperative between the membrane and the orifice for controlling the flow of fluid from the orifice;
   means for exhausting fluid from the exhaust chamber;
   biasing means for biasing the exhaust valve in a closed position to maintain the pressure of the volume above ambient pressure;
   a check valve in fluid communication with the pilot chamber and the volume for permitting fluid under pressure into the volume and preventing fluid flow from the volume, the check valve including a movable element movable between a first position wherein the movable element is in sealing relationship with check valve orifice and a second position wherein the movable element is adjacent a retaining means, and
   means for holding the movable element out of sealing relationship with the check valve orifice, the holding means comprises means for producing a mag- netic field and wherein the movable element is magnetic.

2. A valve as in claim 1, wherein a tubular member is mounted on the membrane and the check valve is mounted in the tubular member.

3. A system for inflating and deflating a rotatable member mounted on a vehicle comprising:
 a fluid control circuit including a source of fluid under pressure and means for providing a source of vacuum, fluid conduit means in fluid communication with the pressurized fluid source and the vacuum source, and control means for connecting the fluid conduit to the pressurized fluid source and to the vacuum source;
 a rotatably mounted member;
 an inflatable member mounted on the rotatable member;
 valve means on the rotatable member for inflating and deflating the inflatable member;
 fluid connection means for providing a fluid connection between the valve means and the fluid conduit of the control means;
 the valve means comprising:
 a cavity;
 a flexible membrane disposed in the cavity and dividing the cavity into a pilot chamber and an exhaust chamber;
 an orifice in the exhaust chamber in fluid communication with the inflatable member;
 exhaust valve member cooperative between the membrane and the orifice for controlling the flow of fluid from the orifice;
 means for exhausting fluid from the exhaust chamber;
 biasing means for biasing the exhaust valve in a closed position to maintain the pressure of the inflatable member above ambient pressure;
 a check valve in fluid communication with the pilot chamber and the volume, for permitting fluid under pressure into the inflatable member and preventing fluid flow from the inflatable member.

4. A system as in claim 3, wherein the exhaust chamber comprises an annular ring member mounted in a well formed on the rotatable member and the membrane is secured between the annular member and the portion of the cavity forming the pilot chamber.

5. A system as in claim 3, wherein the control means includes means for disconnecting the fluid conduit from the pressurized fluid source and the vacuum source.

6. A system as in claim 3, and further comprising means for retarding closing of the check valve.

* * * * *